Dec. 30, 1969  A. DANIELS  3,486,252
MANUALLY OPERATED MECHANICAL SNOWPLOW WITH LEVER POWER HANDLE
Filed May 16, 1967  2 Sheets-Sheet 1

INVENTOR.
ARTHUR DANIELS
ATTORNEY

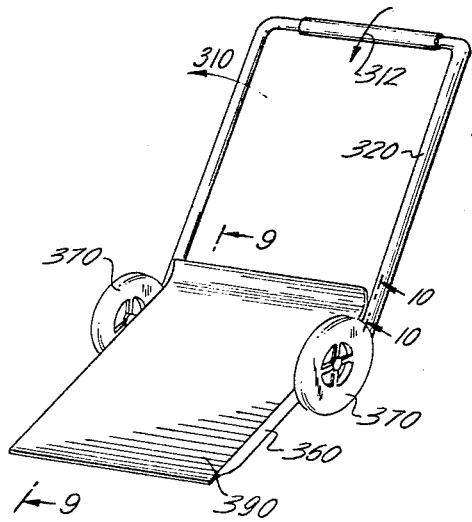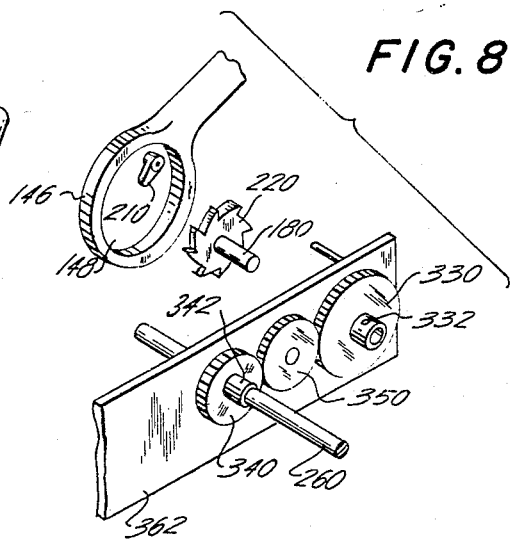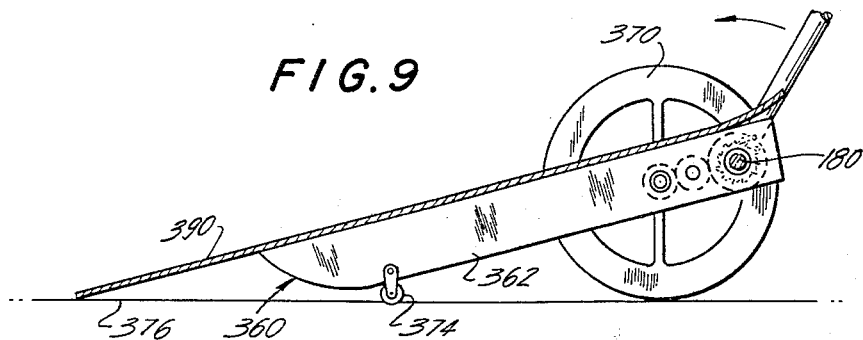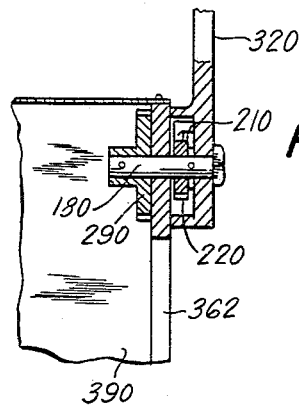

United States Patent Office 3,486,252
Patented Dec. 30, 1969

3,486,252
MANUALLY OPERATED MECHANICAL SNOW-PLOW WITH LEVER POWER HANDLE
Arthur Daniels, 100 E. 39th St., Brooklyn, N.Y. 11203
Filed May 16, 1967, Ser. No. 638,875
Int. Cl. E01h *5/02;* E02f *5/02;* B62b *11/00*
U.S. Cl. 37—53                                    6 Claims

ABSTRACT OF THE DISCLOSURE

An improved manually operated mechanically snowplow is described, the improvement being the presence of a rotary ratchet and pawl arrangement which is attached to a handle forming a lever whose forward motion results in a mechanical advantage imparted to side wheel members. A forward and backward manual rocking motion of the lever handle causes alternate engagement and disengagement of the pawl and ratchet. Engagement of the pawl and ratchet results in forward motion of the snowplow through its side wheel members transmitted by a chain or gear drive to impart a forward thrust on a side wheel member. Disengagement of the pawl from the ratchet by the backward movement of the lever permits the snowplow to be freely rolled on its wheels either forwardly or backwardly.

Background of the invention

This invention relates to an improved manually operated snowplow having a mechanical drive means. Various types of snowplows are known in the art. However, the prior art manual devices require great physical exertion on the part of their human operators. These known devices do not impart any mechanical advantage to the operation thereof. The forward movement of the said devices depends primarily upon the forward physical thrust of their operators. Thus, the operators of these devices often suffer from back strain and many suffer heart attacks while removing snow from sidewalks, driveways, etc.

Summary of the invention

An improved manually operated snowplow is provided. The plow is characterized by having lever means which, when rocked in a forward and return motion, is caused to activate drive means which provide for the repeated forward motion of said plow. When the lever means are held in a lowered or backward position, the drive means becomes disengaged, permitting the plow to be freely and easily moved in either the forward or backward direction. The improved plow is preferably of corrosion-free construction. The mechanical advantage obtained by the arrangement of the lever and drive means of this invention requires only a minimum of exertion on the part of the operator. No longer is it necessary for an operator to rely solely on his own physical exertion and power to operate the plow or snow shovel, even though no electric or gas-powered motor is part of the unit.

It is therefore an object of this invention to provide an improved and inexpensive manually operated snowplow or shovel.

Another object of this invention is to provide a snowplow which, for a forward and return rocking motion of its lever handle causes a forward motion of the snowplow, thus requiring only limited physical exertion on the part of its operator.

Yet another object of this invention is to provide a snowplow which is free to be moved manually forwardly or backwardly due to the disengagement of its lever handle, which takes place automatically when said lever handle is moved and maintained in a lowered-back position.

Brief description of the drawings

FIG. 7 is an isometric view of another embodiment of the snowplow according to FIGS. 1 and 2, showing the relationship of the blade, lever and side wheel members;

FIG. 8 is an exploded view of a modification of the drive connection for transmitting power from the lever handle to the wheel shaft;

FIG. 9 is a cross-sectional side view of the embodiment of FIG. 7, taken along line 9—9 of FIG. 7; and FIG. 10 is a fragmentary cross-sectional view taken along the plane of line 10—10 of FIG. 7 and showing the means of attachment of the drive gear to the handle lever of the embodiment of FIGS. 7-9.

Description of preferred embodiments

Figure 1:
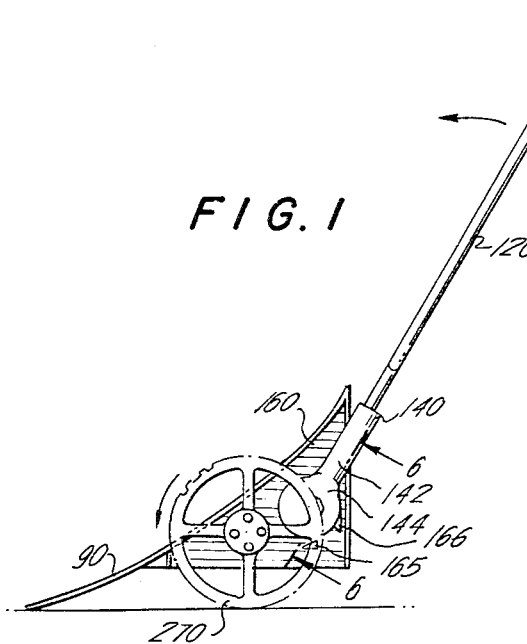
FIG. 1 is a side elevational view of the improved snowplow of the invention, depicting the forward motion of the side wheel member as the lever handle is rocked forward.
Figure 2:
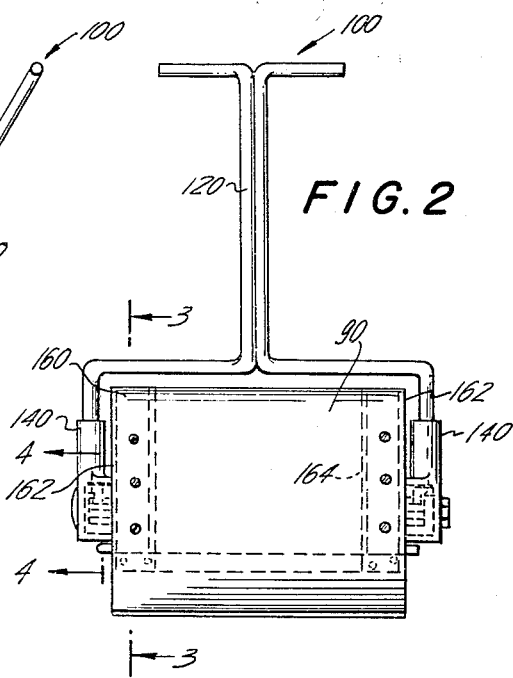
FIG. 2 is a front elevational view of the snowplow of FIG. 1, showing its blade face and the relationship of its manual operating lever to the blade.

As best shown in FIGS. 1 and 2, the lever means, indicated generally by the numeral 100, comprises a handle member 120 which extends downwardly to be fixed snugly into a lever housing 140. The handle member 120 may be fashioned from either wood or a suitable tubular metal, e.g. aluminum, steel, stainless steel, etc., and housing 140 is likewise preferably made from one of these suitable means. The housing 140 has a cylindrical portion 142 into which is fitted the handle member 120. The cylindrical portion 142 of the housing 140 extends downwardly into an arcuate portion 144 forming part of a ring portion 146 having a face plate 148. These housings 140, 140 are mounted (see FIG. 2) on the lateral sides of support means 160 which carry the plow blade 90 by passing a shaft member 180 through a central opening in the end plates 162, 162 of each of the blade supports 160 (see FIGS. 2 and 6). Shaft 180 extends laterally beyond the width of the plow blade 90, as best seen in FIG. 2.

The housings 140, 140 are rotatably positioned relative to shaft 180 by means of bolts 166′ which limit lateral movement of the housings, 140, 140 so that they rest snugly against the outer walls of respective end plates 162, 162. Thus, the axis of housing 140 remains concentric with shaft 180. However, housings 140 can rotate with shaft 180 or about shaft 180, depending upon whether the pawl and ratchet mechanism 210, 220 is in engagement (FIG. 4) out of engagement (FIG. 5).

A drive means, indicated generally by the numeral 200 (see FIG. 3), is positioned in at least one of the two enclosures formed by the inner wall 164 and the outer wall of the left and right plow blade support means 160.

A front attaching plate 168 and a rear attaching plate 170 completes the enclosure or box and forms front and rear members of the plow blade support means 160.

The drive means 200 includes a rotatable ratchet wheel 220 and pawl member 210 engageable and disengageable with the ratchet wheel. For transmitting power from the ratchet wheel shaft 180 to the driving wheels, the embodiment of FIGS. 1–6 includes a pair of sprockets 230, 240 and an endless sprocket chain 250. The sprocket 230 is mounted on shaft 180 and keyed or pinned thereto by key means 232, so that sprocket 230 rotates in unison with ratchet wheel 220 when pawl 210 is in engagement with its ratchet wheel; but need not be in unison and can even move in opposite sense of rotation when the pawl 210 and ratchet wheel 220 are out of engagement.

The second sprocket 240 is fixedly mounted onto the drive wheel shaft 260. A pair of side drive wheels 270 are fixed to the shaft 260, and have their outer peripheries toothed or ribbed for better traction in snow.

Figure 3:
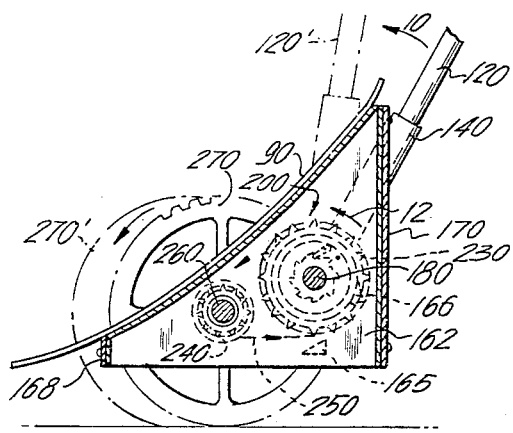
FIG. 3 is a side view, partly in section, taken along the plane of line 3—3 of FIG. 2.
Figure 4:
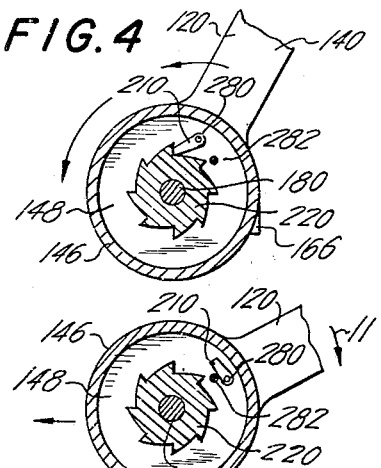
FIG. 4 is a fragmentary sectional view taken along the plane of line 4—4 of FIG. 2, depicting the relationship of the lower portion of the lever housing and the engagement of the pawl with the ratchet.
Figure 5:
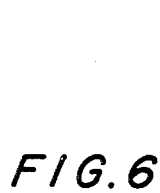
FIG. 5 is another sectional view showing the elements of FIG. 4 in another position with the pawl disengaged from the ratchet.
Figure 6:
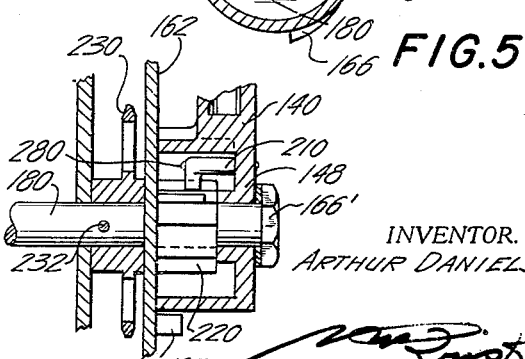
FIG. 6 is a detailed fragmentary cross-sectional view taken along the plane of line 6—6 in FIG. 1, depicting the lever housing, pawl, ratchet and drive sprocket, and their attachment to the side of the blade support means and ratchet wheel.

The driving pawl 210 is pivotally mounted, by pivot pin 280, on the inside of face plate 148 of the housing 140 (see FIGS. 4, 5 and 6). The pawl 210 is so constructed and mounted that it normally tends to fall, by its own weight, into engagement with the ratchet wheel 220, unless the pawl 210 is lifted away from such engagement. For the latter purpose, a lifting pin 282 is provided, mounted on the inside of face plate 148 (see FIGS. 4 and 5). The pawl 210 causes driving action to take place when it is in cooperating engagement with ratchet 220 and when the lever handle 120 is thrust forward to position 120' (shown in phantom lines), in the direction of arrow 10 of FIG. 3. This causes ratchet wheel 220 to rotate in the direction of arrow 12. Chain drive 250 rotates sprocket 240 fixed to wheel shaft 260 in the same direction, and thus causes drive wheels 270 to rotate and move forward to position 270' (shown in phantom lines in FIG. 3).

The power transmission means 200, in the embodiment of FIGS. 1–6 includes the sprockets 230 and 240 and linking sprocket chain 250. In the embodiment of FIGS. 7–10 the power transmission means 200 includes a gear train, discussed later.

The stop pin or lifting pin 282 is fixedly mounted on the end plate of the housing 140 (see FIGS. 4 and 5) and serves to lift and disengage pawl 210 from ratchet wheel 220 when the lever handle 120 is thrust in a backward motion in the direction of arrow 11 of FIG. 5. When the pawl 210 is in the disengaged or lifted position shown in FIG. 5, the entire plow device can be rolled freely in a forward or backward direction on wheels 270, since wheels 270 and their shaft 260 are free to rotate together in either direction.

When the pawl 210 falls into engagement with ratchet wheel 220 but the shaft 260 is the origin of the power, rather than the recipient (for example, due to inertia or when the device is moving downhill) the device will still operate properly without binding or locking, because the pawl 210 will merely ride back on the inclined surface of the ratchet teeth of wheel 220, which will be rotating in the direction of arrow 12, regardless of the angular position of inclination of handle 120.

In the embodiment of FIGS. 7–10, the side driving wheels which, in the embodiment of FIGS. 1–6, as indicated at 270, may be serrated, ribbed or provided with a series of teeth, are shown, as indicated at 370, with rubber snow tread tires to provide traction on snow. Instead of the chain and sprocket transmission, a gear train drive is provided. As best illustrated in FIGS. 7, 8 and 9, the gear drive in this embodiment comprises a gear train having first, second and intermediate gear members 330, 340 and 350, respectively. Gear member 330, the first gear in the gear train (i.e. first when the power is considered originating from the lever handle 320) is fixedly mounted, such as by a collar 332, to ratchet wheel shaft 180. Also fixedly mounted on shaft 180 is the ratchet wheel 220, already described above in connection with the embodiment of FIGS. 1–6. Gear 340 is fixedly mounted, such as by key or pin means on collar 342, to side-wheel shaft 260. As the ratchet wheel 220 is rotated in the direction of arrow 12 of FIG. 3 by movement of handle 120 in the direction of arrow 10 of FIG. 2, or by movement of handle 320 in the direction of arrow 310 of FIG. 7, then while pawl 210 is in cooperating engagement with the ratchet wheel 220, power is normally transmitted from shaft 180 to shaft 260 by the transmission means of either of the illustrated embodiments.

The gears 330, 340, 350 of the gear train are each rotatably mounted on the inner wall of side plate 362 (FIG. 8) of the plow blade support member 360, which supports the plow blade 390 of this embodiment. Also mounted on the forward portion of side plate 362 is a small wheel member 374 which serves to support the forward edge of plow blade 390 sufficiently above ground surface, indicated at 376 in FIG. 9, so as to roll over irregularities in the surface 376 under the snow being removed by the plow blade, and prevents a jarring action from being imparted to the plow blade and back through the transmission to the handle 120. If the blade 390 does hit a snag in the road surface 376, the wheel 374 would tend to ride over it and free the blade 390.

The plow blade 390 is fixedly attached to the upper edge of side plates 362 of support 369, as shown in FIGS. 7 and 9. The plow blade may be either planar at its forward edge, as shown at 390 in FIG. 9, or may be curved, as shown at 90 in the embodiment of FIG. 1. The blades 90 and 390 are preferably made of rust-resistant material.

Operation of the invention

In normal operation, a forward and return rocking motion is imparted to the lever 120 or 320 by the operator, i.e. to the position 120' of FIG. 3 and back to position 120. When the lever 120 is rocked in the forward direction to position 120', the pawl 210 drops by gravity to ratchet wheel 220 and causes the latter to rotate in the direction of arrow 12 of FIG. 3, thus transmitting lever power from the lever handle through the transmission means to shaft 260 and to side wheels 270. In the embodiment of FIGS. 7–10, the power is transmitted from handle 320 through the gear train in a similar manner to side wheels 370.

When the handle 120 is pulled backwardly to position 120 of FIG. 3, the pawl 210 rides over the inclined portion of the teeth of ratchet wheel 220 until the next forward stroke in the direction of arrow 10. If the lever is pulled back further in the direction of arrow 11, the pawl 210 becomes lifted and disengaged from the ratchet wheel 220 by lift pin 282. The pawl 210 is positioned such that a forward rocking of the lever 120 causes consecutive teeth of the ratchet wheel to transmit a sequential rotary motion thereto. As the ratchet wheel 220 rotates in the direction of arrow 12 of FIG. 3, the shaft 180 to which it is fixed likewise rotates in the same direction. Power is transmitted, either through the sprocket and chain drive of the embodiment of FIGS. 1–6, or through the gear train of FIG. 8, to the side drive wheels 270 and 370. The plow or shovel blade 90 or 390 is thus pushed forwardly by the side drive wheels, moving the device along the roadway or driveway or sidewalk surface 376.

When the lever 120 is rocked backwardly in the direction of arrow 11 of FIG. 5 and maintained in this backward position, the pawl 210 is disengaged from ratchet 220 by stop pin 282. In this position the plow 90 may be freely moved in either the forward or rearward direction on wheels 270 or 370 by manually pushing or pulling the handle 100. The housing ring 146 has a stop member 166 which engages an abutment 165 on the outside of plate 162 to limit the backward travel of handle 120 or 320.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The improved manually operated snowplow including snow removing means, support means carrying said snow removing means, manually operable lever means extending into said support means, and mechanical drive means in said support means actuatable by said lever means, wherein said mechanical drive means comprises:
    first shaft means,
    rotatable ratchet means mounted for rotation in unison with said first shaft means,
    pawl means engageable with said ratchet means for imparting rotational motion to the latter in a predetermined direction,
    means operably connecting said pawl means to said lever means for transmitting motion from said lever means to said pawl means,
    second shaft means,
    drive wheel means operably connected to said second shaft means for rotation thereby, and
    transmission means for transmitting power from said first shaft means to said second shaft means.

2. The improved snowplow of claim 1 wherein said means operably connecting said pawl means to said lever means further includes:
    lever housing means fixed to and movable with said lever means,
    pivotal mounting means supporting said pawl means within said lever housing means,
    said first shaft means extending into said lever housing means and supporting said rotatable ratchet means within said lever housing means.

3. The improved manually operated snowplow according to claim 1,
    said support means including enclosure means,
    said transmission means including first and second sprocket means respectively fixed to said first and second shaft means and being rotatably mounted on said enclosure means,
    and sprocket chain means linking said first and second sprocket means and disposed within said enclosure means.

4. The improved manually operated snowplow according to claim 1,
    said support means including enclosure means,
    said transmission means including a gear train having a plurality of gears, respective ones of said gears being fixed to said first and second shaft means,
    said gear train being mounted within said enclosure means.

5. The improved manually operated snowplow according to claim 1, said support means having abutment means fixedly mounted thereon, and stop means fixed to said lever means for limiting the arcuate travel thereof in a predetermined direction.

6. The improved manually operated snowplow according to claim 1, including wheel means disposed beneath said support means.

References Cited

UNITED STATES PATENTS

| | | | |
|---|---|---|---|
| 1,032,455 | 7/1912 | Waskom | 280—246 |
| 1,097,659 | 5/1914 | McGowan | 280—242 |
| 1,332,819 | 3/1920 | Eklund | 280—246 |
| 2,793,868 | 5/1957 | Fuglie et al. | 280—218 |
| 2,846,785 | 8/1958 | Underwood | 37—53 |
| 2,911,736 | 11/1959 | Jewett | 37—45 |
| 3,002,298 | 10/1961 | Baldwin | 294—54 |

FOREIGN PATENTS 725,777  5/1932  France.

ROBERT E. PULFREY, Primary Examiner

EUGENE H. EICKHOLT, Assistant Examiner

U.S. Cl. X.R.

37—130; 172—352; 280—47.34; 294—54